United States Patent [19]

Lester

[11] Patent Number: 4,483,129
[45] Date of Patent: Nov. 20, 1984

[54] ADJUSTABLE BILLET CUTTER

[75] Inventor: Leslie J. Lester, Bundaberg, Australia

[73] Assignee: Versatile Corporation, Vancouver, Canada

[21] Appl. No.: 426,151

[22] Filed: Sep. 28, 1982

[51] Int. Cl.³ .................... A01D 45/10; A01D 55/264
[52] U.S. Cl. .................... 56/13.9; 56/11.9; 56/500
[58] Field of Search .............. 56/10.7, 13.9, 11.9, 56/11.1, 60, 500, 504

[56] References Cited

U.S. PATENT DOCUMENTS

| 2,766,572 | 10/1956 | Vogelmar | 56/10.7 |
| 3,548,951 | 12/1970 | Wensel, Jr. et al. | 56/10.7 |
| 3,673,774 | 7/1972 | Mizzi | 56/13.9 |
| 3,736,732 | 6/1973 | Jennings et al. | 56/11.1 |
| 3,739,559 | 6/1973 | Long et al. | 56/13.6 |
| 3,774,380 | 11/1973 | Ancellin | 56/11.9 |
| 3,848,399 | 11/1974 | Makeham | 56/13.9 |
| 3,885,375 | 5/1975 | Solterbeck | 56/11.9 |
| 4,009,556 | 3/1977 | Molzahn | 56/11.1 |
| 4,196,569 | 4/1980 | Quick | 56/13.9 |

Primary Examiner—Paul J. Hirsch
Attorney, Agent, or Firm—Wenderoth, Lind & Ponack

[57] ABSTRACT

A device to adjust the length of billets in a cane harvester. Hydraulic motors of different fluid throughput capacity drive chopper rolls which are mechanically connected. The outlet of one of the motors conveys fluid through a connection to the feed rolls which convey the cane to the chopper rolls. The outlet connection of a second of the hydraulic motors is interchangeable so that the fluid from either motor may pass to the feed rolls as desired.

9 Claims, 5 Drawing Figures

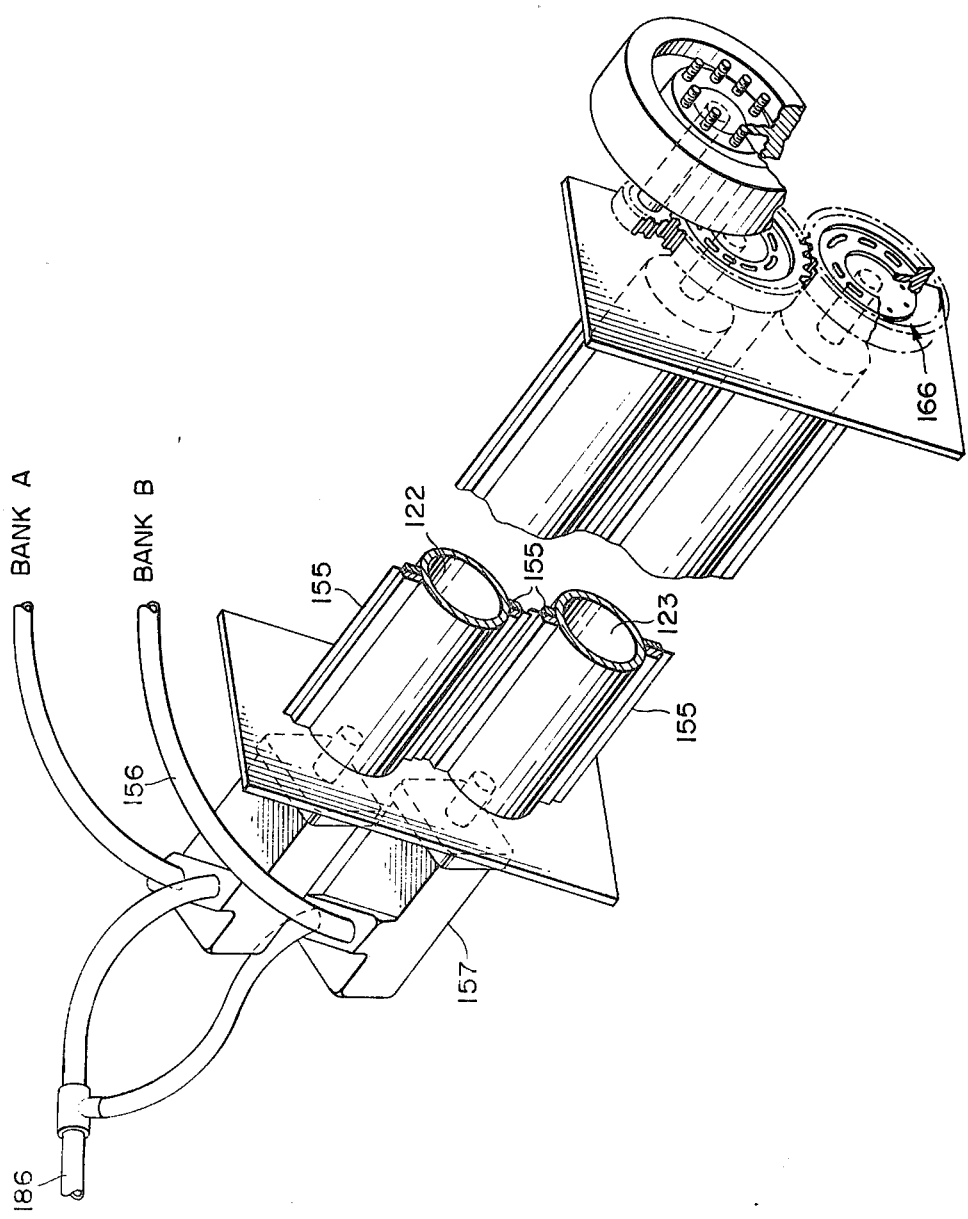

ADJUSTABLE BILLET CUTTER

INTRODUCTION

This invention relates to an adjustable billet cutter for cane harvesters and, more particularly, to a cane harvester using chopper rolls to sever cane into billets.

BACKGROUND OF THE INVENTION

It is desirable to have a cane harvester which may cut billets of variable length. This is so because billets of a certain length may be more desirable for some purposes than others. For example, relatively shorter billets give more density to field transporters which results in faster and more efficient harvesting. Relatively longer billets are desirable because they produce the highest quality sugar due to the minimization of billet ends during transport and/or storage. On the other hand, specific length billets may be required for use in the correct operation of billet planters. Different weather conditions may also dictate the most desirable billet length.

This variable billet length feature is presently provided in harvesters by changing the gearing or using variable capacity motors. Changing gears is unnecessarily time consuming and providing variable capacity motors is expensive.

SUMMARY OF THE INVENTION

According to the invention there is disclosed an adjustable billet cutter for a cane harvester comprising at least two mechanically interconnected chopper rolls to cut cane, hydraulically powered conveyor rolls to convey cane to said chopper rolls, each of said chopper rolls being powered by a respective hydraulic motor each of said motors having a different displacement and interchangeable fluid connections from the outlet of each of said motors, a first one of said connections running to said hydraulic powered conveyor rolls.

BRIEF DESCRIPTION OF THE SEVERAL VIEWS OF THE DRAWINGS

The invention will now be described, by way of example only, with reference to the accompanying drawings in which:

FIG. 3 is a view of the chopper rolls with their hydraulic motors; and

DESCRIPTION OF THE SPECIFIC EMBODIMENT

Figure 1:
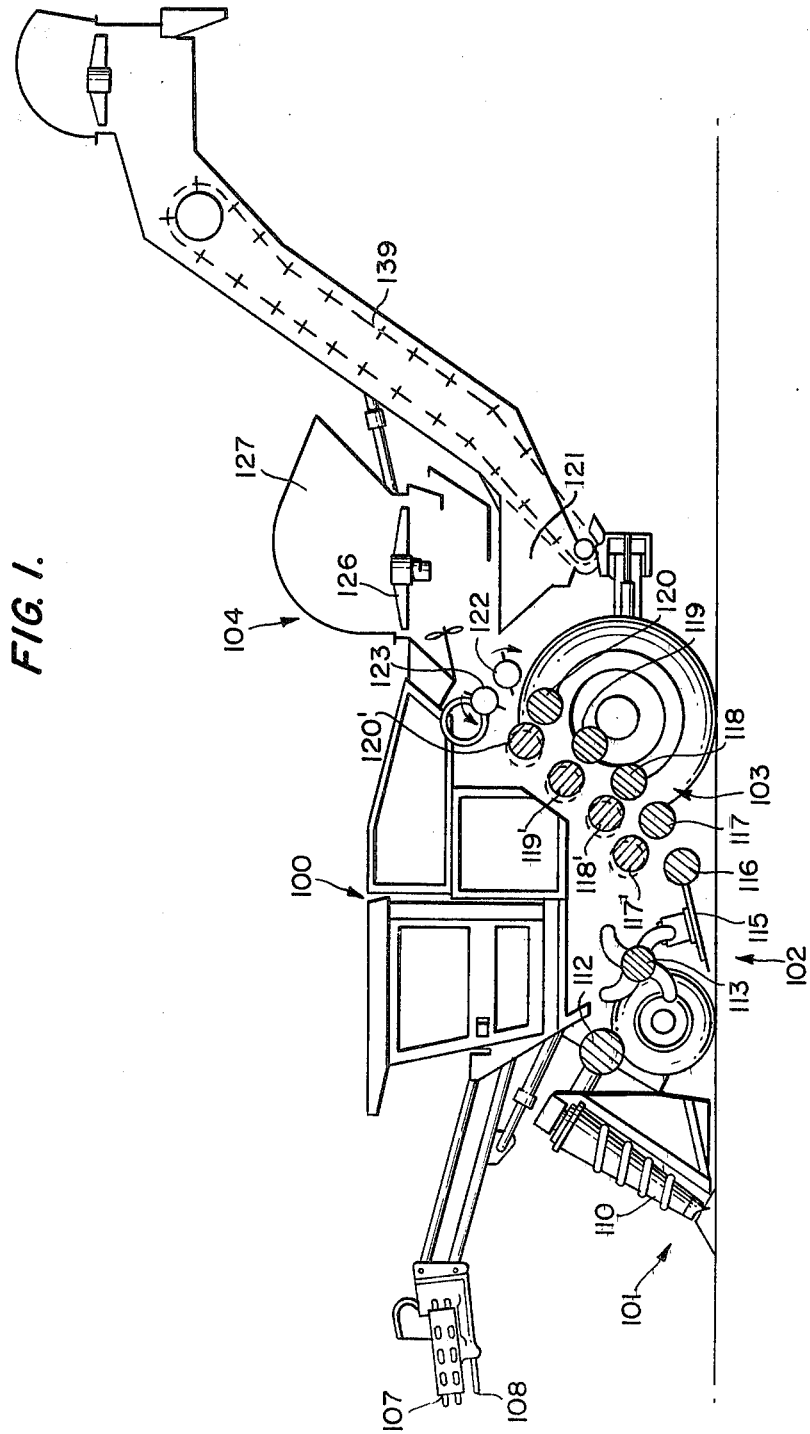
FIG. 1 is a side view of a cane harvester.

Referring now to the drawings, a sugar cane harvester is shown generally at 100. It comprises four main areas, namely gathering area 101, cutting area 102, feeding area 103 and cleaning and conveying area 104.

The gathering area 101 gathers and tops the cane with gathering discs 107 and cutting discs 108, respectively. The spiral feed rolls 110 feed the crop to the cutting area 102 where the crop is "knocked down" by knock down rollers 112, 113, and severed by base cutters 115. The crop is then conveyed by conveyor feed rolls 117, 117' to feed rolls 118, 118', 119, 110', 120, 120' and, thence, to chopper rolls 122, 123.

The cut crop passes from the chopper rolls 122, 123 to the cleaning area 104 where chaff and other crop debris is exhausted through discharge hood 127 by extractor fan 126. The billets provided by the chopper rolls 122, 123, drop into the receiving area 121 and are conveyed by elevator 139 to a storage device such as a transporter (not shown).

Figure 2:
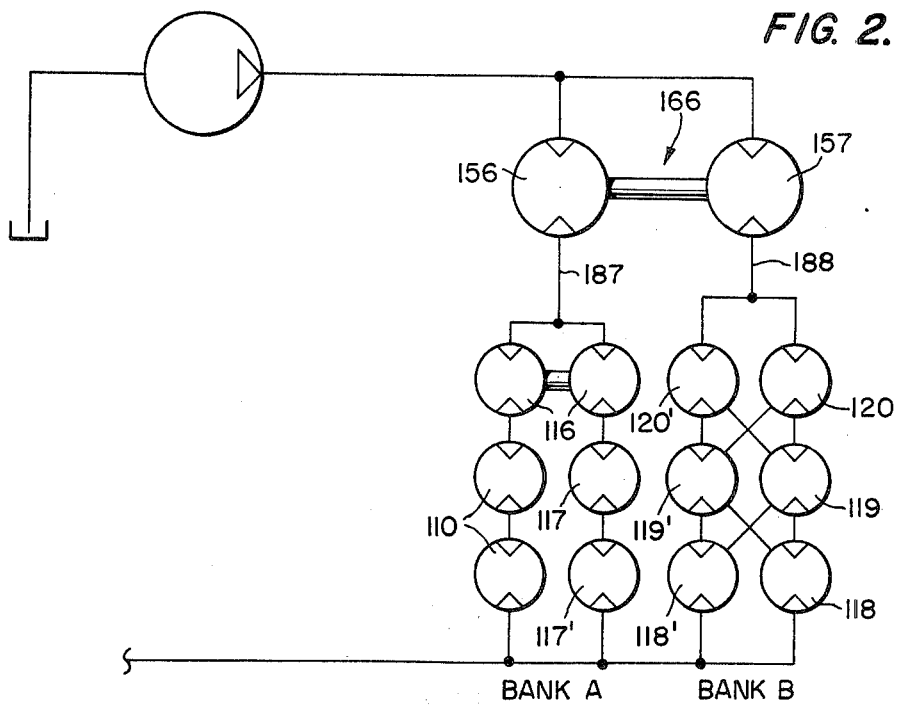
FIG. 2 is a partial schematic diagram of the hydraulic circuit of the harvester.
Figure 4:
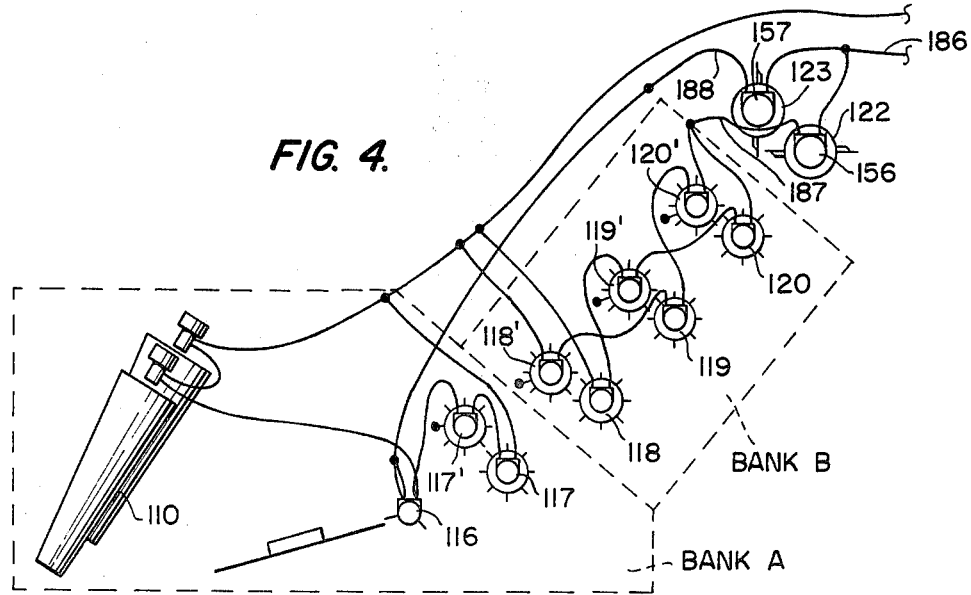
FIG. 4 is a schematic view of the hydraulic circuit of the chopper, feed and conveyor rolls.
Figure 5:
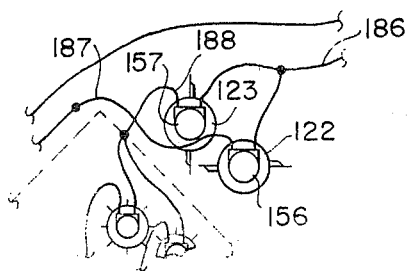
FIG. 5 is a view of the alternate hydraulic circuit of FIG. 4

A partial schematic of the hydraulic system used for the feed and chopper rolls is shown in FIGS. 2, 4 and 5. A source of hydraulic fluid supplies fluid in parallel to hydraulic motors 156, 157. Hydraulic motors 156, 157 are of different displacement capacities and drive chopper rolls 122, 123, respectively. It has been found that a capacity for motor 156 of 20 cu.in. displacement is satisfactory and, likewise, a capacity for motor 157 of 25 cu.in. displacement is suitable.

The chopper rolls 122, 123 are connected together by gear means shown generally at 166 in FIG. 3. The gears are adjustable in order to set the distance between the knives 155 of the copper rolls 122, 123. The gear means 166 also equalizes the torque exerted by the hydraulic motors 156, 157 despite the different displacements of the hydraulic motors 156, 157.

The outlets of each hydraulic motor 156, 157 are respectively connected to the banks A, B of the hydraulic motors as better seen in FIG. 4. Bank A contains the hydraulic motors used to power the spiral feed rollers 110, the butt rollers 116, feed roller 117 and pinch roller 117'. Bank B contains the hydraulic motor used to power the feed rollers 118, 119, 120 and their corresponding pinch rollers 118', 119' and 120'.

Various valves, tanks and other hydraulic fluid apparatus (not shown) are within the hydraulic circuit, but it is not considered necessary to show them.

The input line 186 allows the fluid to flow into the inlet ports of hydraulic motor 156, 157 and outlet lines 187, 188 allow fluid to flow from the outlet ports of motors 156, 157 and pass to banks B and A, respectively. The outlet lines 187, 188 are flexible hydraulic hoses attached by couplings (not shown) to the outlet ports of hydraulic motors 156, 157.

OPERATION

In operation, the cane is severed by basecutters 115 and conveyed by butt rollers 116 and conveyor rollers 117, 117' to the conveying passage. Feed and pinch rollers 118, 118' together with feed and pinch rollers 119, 119', 120, 120' convey the cane to chopper rolls 122, 123. The chopper rolls 122, 123 sever the cane into billets.

It has been found that the speed of rolls 116, 117 and 117' does not significantly affect the speed of the billets as they pass to the chopper rolls 122, 123. Rather, the speed of feed and pinch rolls 118, 118', 119, 119', 120, 120' on bank B is of primary importance. Since the smaller capacity motor 156 passes fluid to the hydraulic motors in bank B, these motors will be operating at a reduced speed. This reduced speed results in the slower feeding of cane to the chopper rolls 122, 123 which, in turn, results in shorter length cane billets.

If it is desired to increase the length of the cane billets, the outlet hoses 187, 188 are merely interchanged between the outlet ports of the hydraulic motors 156, 157 as seen in FIG. 5. The fluid flow from the larger capacity motor 157 will then pass to the hydraulic motors of bank B. These motors will then run at an increased speed which, in turn, conveys cane to the chopper rolls 122, 123 at an increased speed resulting in billets of a longer length.

A third motor could be utilized to power the chopper rolls 122, 123. The third motor used could, for example, have a capacity of 30 cu.in. and, where desired, could be substituted for one of the motors 156, 157.

With the third motor, yet further billet lengths may be obtained. The third motor could be substituted for the motor of 20 cu.in. capacity giving an operating ratio of 30/25 for the chopper motors 156, 157. Since the displacement of the motors 156, 157 is increased and the quantity of oil input remains constant, the speed of the chopper rolls will decrease giving a longer billet. By interchanging the outlet hoses 187, 188, the speed of the feed rolls may be increased or decreased. Thus, the capability to generate two additional billet lengths has been created. It has been found that fluid capacities of 20 cu.in., 25 cu.in. and 30 cu.in. for the hydraulic motors of the choppr rolls results in billet lengths of 9 in., 10½ in. and 12 in. respectively.

A further modification contemplated would be to install a simple valve in the hydraulic circuit between chopper motors 156, 157 and the hydraulic motors in banks A, B. Rather than interchange hoses, the valve could simply be operated. This operation of course, could be performed from a remote location by various means.

Accordingly, there has been described a novel and improved design for cane harvesters. Many modifications in addition to those disclosed will occur to those skilled in the art which modifications will, however, not depart from the spirit of the invention. The invention should, therefore, be construed only with reference to the accompanying claims.

I claim:

1. An adjustable billet cutter for a cane harvester comprising chopper rolls to cut cane into billets, each of said chopper rolls being powered by a respective hydraulic motor, each of said hydraulic motors having a different displacement capacity, hydraulically powered conveyor rolls to convey said cane to said chopper rolls, a first fluid connection between the outlet of a first of said hydraulic motors and said hydraulically powered conveyor rolls, said fluid connection being interchangeable between said outlet of said first hydraulic motor and the outlet of a second of said hydraulic motors.

2. An adjustable billet cutter as in claim 1 wherein said fluid connection is hydraulic hose.

3. An adjustable billet cutter as in claim 2 wherein said hydraulic hose may be connected between said feed rolls and the outlet of each of said hydraulic motors.

4. An adjustable billet cutter as is claim 3 and further comprising hydraulically powered conveyor rolls to convey cane to said feed rolls, a second fluid connection from a second of said hydraulic motors to said hydraulically powered conveyor rolls, said first and second fluid connections being interchangeable.

5. An adjustable billet cutter for a cane harvester comprising at least two mechanically interconnected chopper rolls to cut cane, hydraulically powered conveyor rolls to convey cane to said chopper rolls, each of said chopper rolls being powered by a respective hydraulic motor, each of said motors having a different displacement and interchangeable fluid connections from the outlet of each of said motors, a first one of said connections running to said hydraulic powered conveyor rolls.

6. An adjustable billet cutter as in claim 5 and further comprising hydraulically powered feed rolls to feed said cane to said conveyor rolls, a second of said connections running to said hydraulically powered feed rollers, said first and second connections being interchangeable.

7. An adjustable billet cutter as in claim 6 and further comprising an additional hydraulic motor adapted to be interchangeable with one of said hydraulic motors used to power said chopper rolls.

8. An adjustable billet cutter as in claim 7 wherein said fluid connections are conduits used to carry said hydraulic fluid.

9. An adjustable billet cutter as in claim 8 wherein said conduits are hydraulic hoses.

* * * * *